United States Patent [19]

Bachel et al.

[11] Patent Number: 5,006,669
[45] Date of Patent: Apr. 9, 1991

[54] END MEMBER FOR A LONGITUDINALLY DIVIDED CABLE SLEEVE

[75] Inventors: Ernst Bachel, Geltendorf; Anton-Guenther Licker, Munich, both of Fed. Rep. of Germany

[73] Assignee: Siemens Aktiengesellschaft, Berlin and Munich, Fed. Rep. of Germany

[21] Appl. No.: 528,423

[22] Filed: May 25, 1990

[30] Foreign Application Priority Data

Jul. 18, 1989 [DE] Fed. Rep. of Germany ....... 3923762

[51] Int. Cl.$^5$ ............................................. H02G 15/04
[52] U.S. Cl. ........................................ 174/93; 174/92
[58] Field of Search ............... 174/92, 93, 155, 156, 174/157; 248/68.1

[56] References Cited

U.S. PATENT DOCUMENTS

| | | | |
|---|---|---|---|
| 3,742,119 | 6/1973 | Newman | 174/155 X |
| 4,002,818 | 1/1977 | Kunze | 174/93 X |
| 4,236,047 | 11/1980 | Haeder | 174/93 X |
| 4,711,975 | 12/1987 | Morel et al. | 174/93 X |
| 4,752,653 | 6/1988 | Bachel et al. | 174/93 |

FOREIGN PATENT DOCUMENTS

219072A2 4/1987 European Pat. Off. .

Primary Examiner—Morris H. Nimmo
Attorney, Agent, or Firm—Hill, Van Santen, Steadman & Simpson

[57] ABSTRACT

The present invention is directed to an end member for a cable sleeve, which end member is sub-divided into at least three segments, with each of the segments having a planar surface coacting with adjacent segments to form a parting plane on which cables are inserted. Each of the segments carry pressure plates which are urged toward each other to grip any cable being inserted therein to firmly anchor the cable in the end member of the cable sleeve.

16 Claims, 5 Drawing Sheets

END MEMBER FOR A LONGITUDINALLY DIVIDED CABLE SLEEVE

BACKGROUND OF THE INVENTION

The present invention is directed to a sealing end member for a longitudinally divided cable sleeve, which end member is composed of thermoplastic material with adaptable cable entry openings, which are cut, when desired, along a parting plane between two segments forming the end member, and the end member has an integrated intercepting element for gripping each of the inserted cables.

U.S. Pat. No. 4,752,653, whose disclosure is incorporated herein by reference thereto and which claims priority from the same German application as European Patent application Ser. No. 0 219 072 A2, discloses an end member for sealing a longitudinally divided cable sleeve or fitting. The end member of this patent is divided into two equal halves, which halves are separated by a parting plane that extends parallel to the direction of insertion of the cables through the end member into the cable sleeve. In this parting plane, transitions/lead-ins/insertions and sealing of the cables are performed, wherein an interception element is additionally arranged to provide a gripping means for gripping each of the cables. This interception element is basically composed of two pressure plates which can be offset relative to one another and these pressure plates, likewise, have entry openings corresponding to the entry opening of the sealing member. However, the pressure plates are arranged at a small distance from one another when the entry openings are formed. Thus, when the pressure plates are moved against one another, they do not form an entirely circular shape of the entry openings and are narrowed into a type of almond shape or oval shape and the inner diameter is less than that of the cable. Thus, an inserted cable will be squeezed and gripped by these plates and this will transfer any tensile forces applied to the cable directly to the end member.

End members having this type of gripping means can only be used with end members having two halves. However, if a greater number of cable entries are required, additional parting planes between the segments forming the end member must be provided and, thus, more sealing member segments will be required. With the present technology disclosed in the above-mentioned patent, the cable interception is no longer possible since, in the case of a central segment, no manipulation from the outside of the pressure plate can occur.

SUMMARY OF THE INVENTION

The object of the present invention is to create a sealing end member with several segments separated by several entry planes or parting planes, wherein a cable gripping means can be employed at all of the parting planes.

The object is obtained in a sealing end member for a longitudinally divided cable fitting, which end member is composed of thermoplastic material and has adaptable cable entry openings in a parting plane between segments of the end member, which openings can be cut or formed as necessary, the end member has an integrated gripping means for gripping each of the inserted cables. The improvements are that the end member is divided into more than two segments with each adjacent segment forming a parting plane capable of having cable entry openings formed on the plane, reinforcing connecting elements being provided for holding the segments together, each of the reinforcing elements having portions extending across the adjacent parting planes of the segments to prevent movement of the segments relative to one another, said gripping means including a plurality of cooperating pressure plates with a pressure plate being provided for each of the outer segments and each inner or middle segment having two individual pressure plates and means for urging the outer pressure plates inward and the pressure plates of the inner segments in an outward direction so as to grip each cable disposed at the corresponding plane.

Compared to the prior art devised, the embodiment of the present invention has several advantages. Thus, it is possible to insert more cables, due to having more than one parting plane, with the parting planes residing one above the other, and that it has been possible to, so far, since the total overall length of the seal available for the cable transition will increase. However, due to a multiple division of the sealing member into three or more segments, considerable difficulties arise with regard to stability, which is overcome by the embodiment of the invention in that reinforcing connecting elements are employed which extend across each of the parting planes so that it is not possible for the individual segments to slide or shift relative to each other. The fashioning of the invention regarding the reinforced elements forming the gripping means in the entry region creates the possibility that the lead-in cables can be squeezed even from the center or middle segments.

Other advantages and features of the invention will be readily apparent from the following description of the preferred embodiments, the drawings and claims.

DESCRIPTION OF THE PREFERRED EMBODIMENTS

Figure 1:
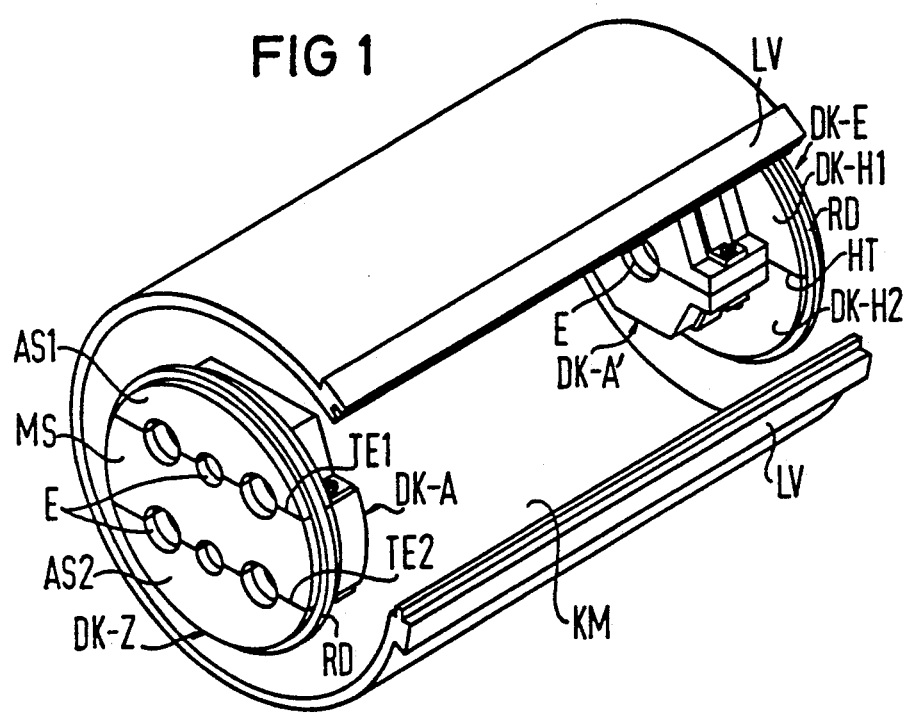
FIG. 1 is a perspective view of a cable sleeve utilizing a sealing end member in accordance with the present invention.

The principles of the present invention are particularly useful when incorporated in a sealing end member, generally indicated DK-Z in FIG. 1. The member DK-Z is used to close one end of a cable sleeve KM, whose other end is closed by a previously known sealing end member, generally indicated at DK-E. The conventional or previously known end sealing member DK-E has a parting plane HT and is, thus, divided into two sealing member halves, DK-H1 and DK-H2. The sealing end member DK-Z of the present invention, however, has two parting planes TE1 and TE2 so that it is formed by three segments, AS1, AS2 and MS. Due to two parting planes TE1 and TE2, it is possible for the end member DK-Z to accommodate considerably more entry openings E than in the conventional end member DK-E, which has a single plane HT.

The end member DK-Z has a sealing member projection, generally indicated at DK-A, while the end member DK-E has a sealing member projection, generally indicated at DK-A'. In the projection DK-A and DK-A', the necessary sealing chambers and pressure plates are provided. As needed, entry openings E are cut and cables can be inserted into the opening E and in an actual manner are sealed with inserts composed of plastic sealing material. After the individual sealing segments AS1, AS2 and AS3 are fastened, the round seal element RD is placed on fully mounted sealing members DK-E and DK-Z. Subsequently, the split sleeve or pipe with the longitudinal seal LV is assembled on the end members in a familiar manner and is preferably sealed with wedge-shaped beads or ribs and correspondingly shaped rails or tracks being used for this sealing. The arrangement of the cables and various parting planes of the sealing member DK-Z makes it possible to insert additional cables at a later time, without the already-equipped parting plane suffering damage, since it does not have to be opened.

Figure 2:
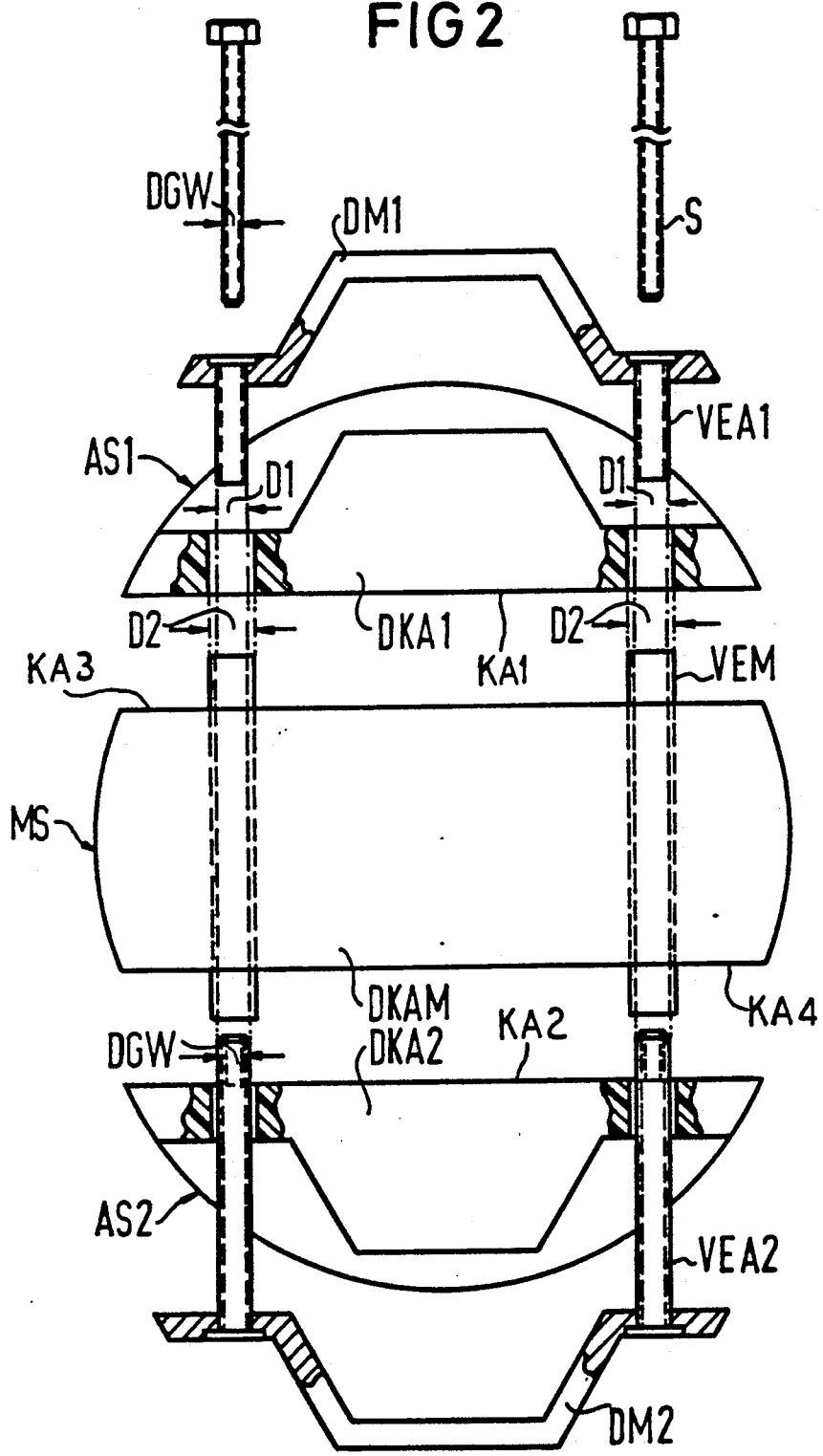
FIG. 2 is an end view of a sealing member in accordance with the present invention in an open and expanded condition.

FIG. 2 shows how it is possible to overcome the difficulties of multiple division, particularly here in the case of sub-divisions into two outer segments AS1 and AS2 and a middle segment MS regarding stability, particularly on the canting of the segments relative to each other. According to the invention, stiffening and reinforcing connecting elements VEA1, VEA2 and VEM are used here and will engage into one another and, thus, reach beyond the parting planes. These connecting elements are guided tightly or even matchingly in borings of the individual sealing member segments so that corresponding to the illustration a double through-going reinforcing results in the sealing members. Thus, the borings are applied in the outer segments AS1 and AS2 into which the connecting elements VEA1 or VEA2 can be placed with their excess length extending beyond a surface KA1 or KA2 of the outer element AS1 or AS2 and into the middle or center segment MS. The connecting elements VEA1 are mounted on a clamp strap DM1 while the clamp strap DM2 supports the elements VEA2. Each of the outer segments AS1 and AS2 have bores with a diameter D2 which will receive the connecting elements VEM of the center segment MS, which also have a diameter of approximately D2. Thus, when segments AS1, AS2 and MS are assembled, the connecting elements VEM, which extend outward from surfaces KA3 and KA4, are received in the bores of the respective outer segments AS1 and AS2. The connecting elements VEA1 of the clamp strap DM1 and the elements VEA2 of the clamp strap DM2 have an outer diameter of D1 and the middle segments MS has bores with an outer diameter D1 so that these elements can be telescopically received in the connecting elements VEM and extend into the interior of the middle segment MS. The diameters of these connecting elements VEA1 and VEA2, as well as the bores, are selected so that there is as little play as possible, but to allow the easy insertion thereof. In this way, eventually a mutual reinforcement and stiffening beyond the parting planes TE1 and TE2 will occur. Elongated screws, such as S, will engage, respectively, in the inside threads DGW of the opposite inside ends of the connecting elements VEA2, and in this way, it is possible to achieve, during the preassembly, to already fasten the individual sealing member segments at a relatively great distance from one another so that sufficient free space is given when the cables are mounted. Due to the arrangement of the inside threads at the inner ends of the connecting elements VEA2, it is additionally achieved that in the final condition, the excess lengths of the screws S required for the pre-assembly will lie within the connecting elements so that no disturbing overprojections will occur.

Figure 3:
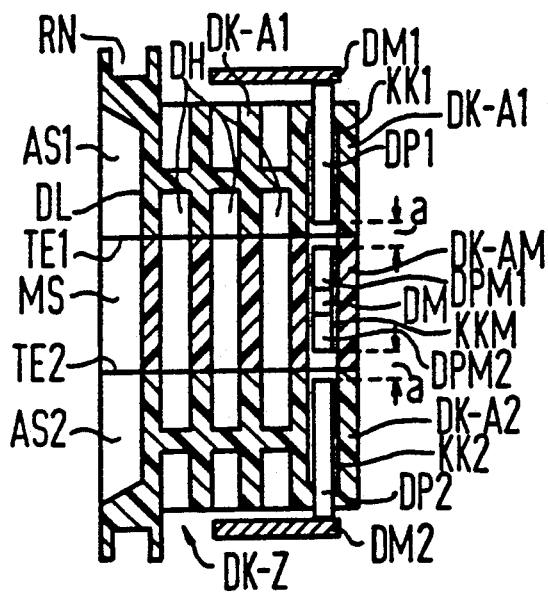
FIG. 3 is a cross sectional view of an end member in accordance with the present invention.

As shown in the cross sectional view of FIG. 3, the sealing member DK-Z has two parting planes TE1 and TE2, according to the present invention. At one end, one will recognize the all around circumferential ring groove RN, which receives the sealing element RD to form a seal with the split sleeve KM. In the portion DK-A extending from the area where the ring groove RN is, the sealing arrangement is composed of, successively, residing sealing lips DL with intermediate storage sealing cavities DH and these lips form a seal against the inserted cable in an actually known manner. In the three extending parts DK-A1, DK-A2 and DK-AM, so-called wedge chambers KK1, KK2 and KKM are arranged and extend in parallel fashion to the sealing cavities DH. Into these wedge chambers, the pressure plates DP1, DP2, DPM1 and DPM2 are introduced, which, together with the pressure means formed by the clamp straps DM1 and DM2, and a pressure means DM, to be described hereinafter, the plates will intercept the lead-in cables.

Figure 4:
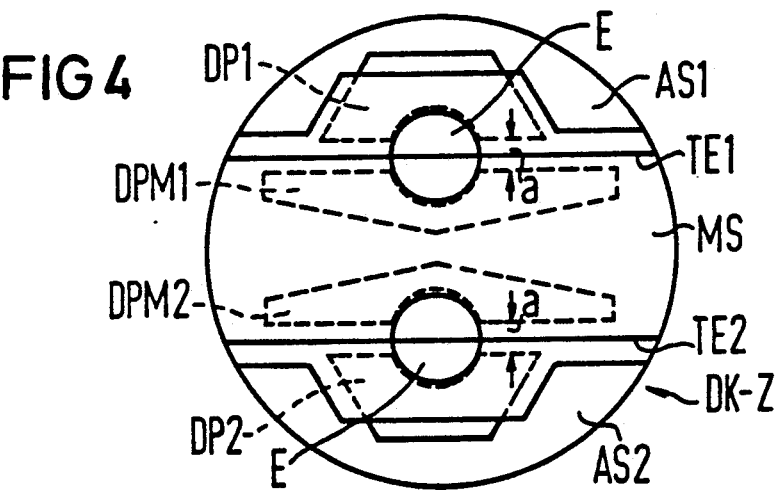
FIG. 4 is a right end view of the end member of FIG. 3 with the gripping elements in the expanded or non-gripping position.
Figure 5:
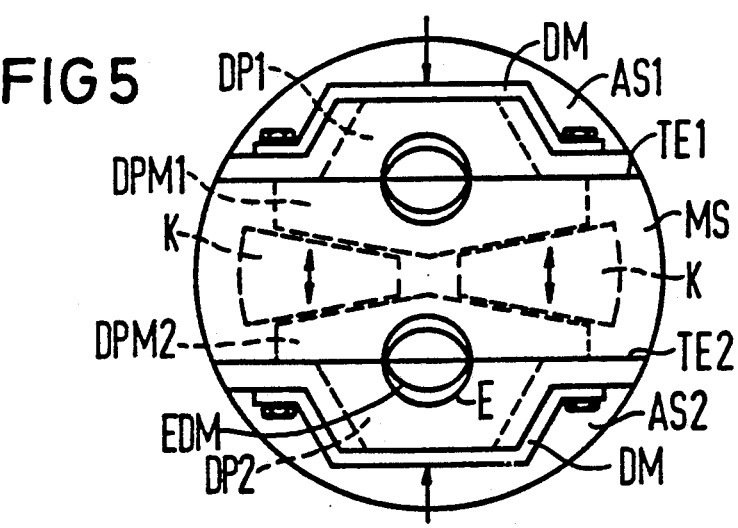
FIG. 5 is a right end view similar to FIG. 4 with the gripping elements in a gripping position.

In the preassembled condition, these pressure plates are arranged, respectively, at the suitable distance a from one another on both sides of the parting planes TE1 and TE2. Also in this condition are the entry openings E cut through the sealing members. The pressure means formed by the clamp straps DM1 and DM2, whereas the internal pressure means DM in the center segment MS is fashioned as a wedge. In the preassembled condition, which is illustrated in FIG. 4, the pressure plates DP1 and DP2 on the outer segments AS1 and AS2, as well as the pressure plate DPM1 and DPM2 in the middle or center segment MS, are drawn in dotted line fashion in the position of the preassembly. One recognizes that for each parting plane TE1 and TE2, respectively, one pressure plate coupled DP1 and DPM1 or DP2 and DPM2 is provided. With the assistance of the outer or outside pressure means, the two outer pressure plates DP1 and DP2 can be pressed in a known manner with the clamp straps in their wedge chambers against the corresponding parting plane. However, at first, the counter-support is missing in order to be able to seize and fashion the cable insert into the entry opening E. According to the invention, in the center segment MS, the inside pressure plates DPM1 and DPM2 indicated therein are pressed toward the outside, namely, preferably, with the help of wedges K (FIG. 5). In FIG. 4, one also sees that the pressure plates residing opposite one another arranged at a distance a. The size of the distance depends on the type and condition of the cable to be inserted. It is to be selected so that after being pressed in, the cable is kept in an anti-slide fashion. The cable is thereby contracted all-around up to a depth that depends on the cable structure. The cutting of the entry opening E of the pressure plates insures, in this shown adjustment, so that a circular-shaped cutout height is respectively lower in the case of the pressure plates than in the case of the sealing lips of the sealing members.

The effects of these various cutout heights of the sealing lips and the pressure plates of the subsequent fastening of an intercepted device are readily shown in FIG. 5. Due to the pressing on the outside pressure plates DP1 and DP2 within the wedge chambers of the two outside segments AS1 and AS2 in the direction of arrows with the assistance of the two pressure means DM, the pressure plates are slid against the parting planes TE1 and TE2 and the previous distance a reduces itself. These two inner pressure plates DPM1 and DPM2 in the wedge chamber of the center segment MS reside on the inside are camfered in the opposite direction on their sides residing opposite to one another so that on both sides of the center line toward the outside recess is resolved expanding in a wedge-shaped fashion, as can be readily seen in FIG. 4. Into these wedge-shaped recesses, the wedges K are driven from the outside, which causes two pressure plates DMP1 and DMP2 to be pressed outwardly in a direction of the parting planes TE1 and TE2, as indicated by the double arrow. By that, the inserted cables are contracted from the inner side as well as the results are an almond or oval-shaped embracing of the cables, as disclosed by the Figure. This deformation results, since the actual circular-shaped entry openings are cut in the pressure plates, which are arranged at the distance a from one another. Thus, a complete circular shape no longer results when the pressure plates are shifted relative to one another. This principle can also be realized by other pressure mechanisms, however, it must always be observed that, respectively, two pressure plates can be offshifted relative to one another.

Figure 6:
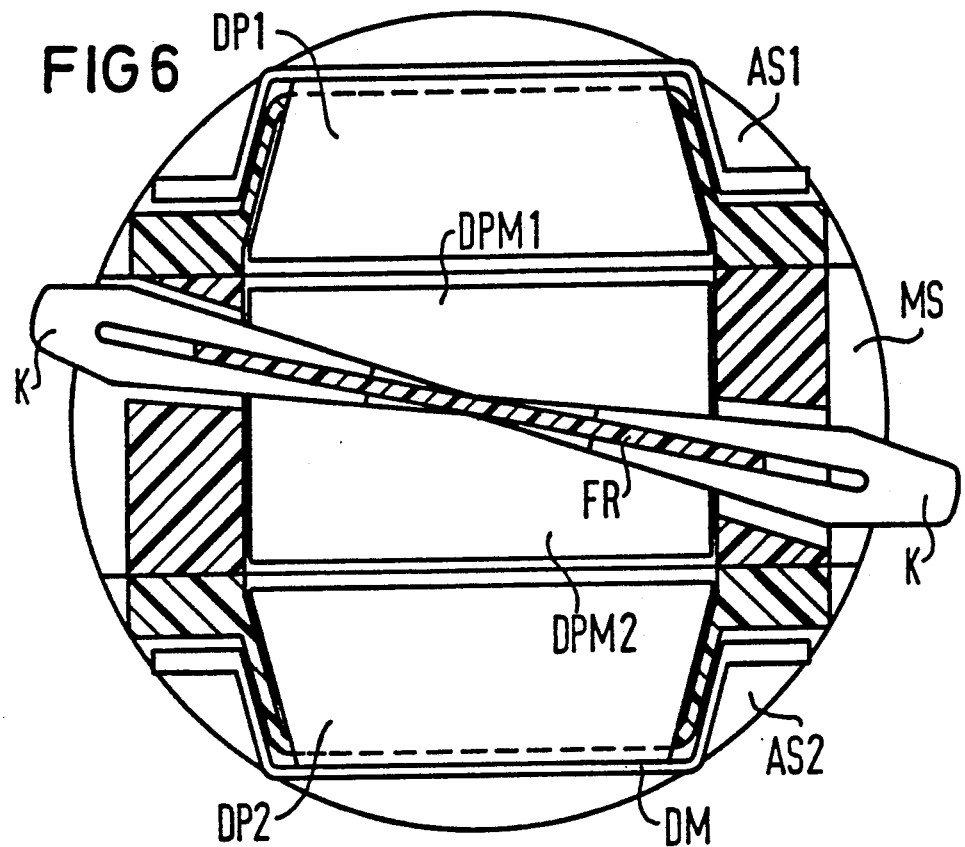
FIG. 6 is a partial cross sectional view with portions in elevation for purposes of illustration of wedge elements for activating the internal gripping elements in their segments.

An exemplary embodiment of the invention is illustrated in FIG. 6, which illustrates the inner pressure plates DMP1 and DMP2 in the center of the middle segment MS are camfered in opposite directions towards both sides, and that, between them, a guiding rib FR is arranged. This guiding rib FR, thereby, divides the two wedge-shaped free spaces between the two inner pressure plates DPM1 and DPM2. However, the free space or other spaces are moreover arranged such that the wedge adapted thereto can be pressed therein from the outside. In this specific exemplary embodiment, double wedges K are used, which have a U-shaped construction. The adjustment between the double wedges K and the guiding rib FR occurs in that the guiding rib FR is guided between the two lateral sides of the wedges K. By that, a uniform expelling of the inner pressure plates DPM1 and DPM2 toward the outside will occur. This exemplary embodiment, furthermore, uses two wedges of the types that are driven in oppositely residing fashion. The outside pressure plates DP1 and DP2 are pressed in a known manner with the assistance of the pressure means DM.

Figure 7:
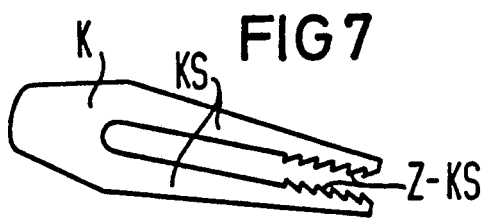
FIG. 7 is a plan view of a gripping element used in FIG. 6.
Figure 8:
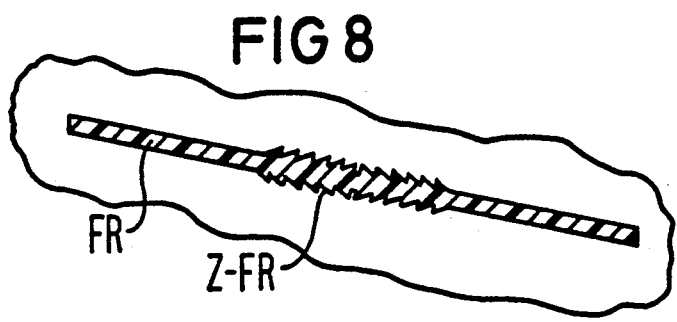
FIG. 8 is a cross sectional view of a guiding rib for the wedges of FIG. 7.

FIG. 7 shows the U-shaped double wedge K, which, on the inside of its legs KS, is provided, at least partially, with teeth Z-KS proceeding in an oblique fashion on one side. The guiding rib FR (FIG. 8) has teeth Z-FR arranged in the opposite fashion to cooperate with the teeth Z-KS. These teeth Z-KS and Z-FR serve as catch elements whereby they prevent the wedges K from becoming loose again after it has been inserted.

Figure 9:
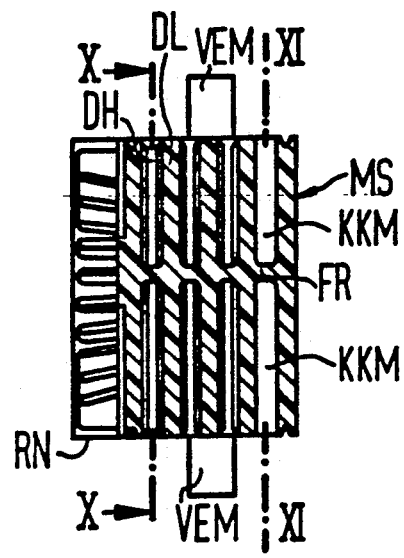
FIG. 9 is a transverse cross sectional view of the inner segment used in the embodiment of FIG. 6.
Figure 10:
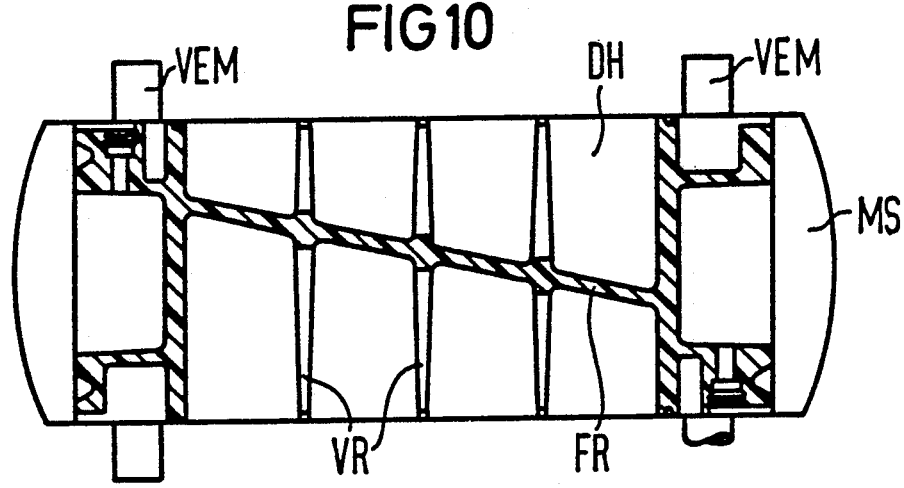
FIG. 10 is a cross sectional view taken along the lines X—X of FIG. 9.
Figure 11:
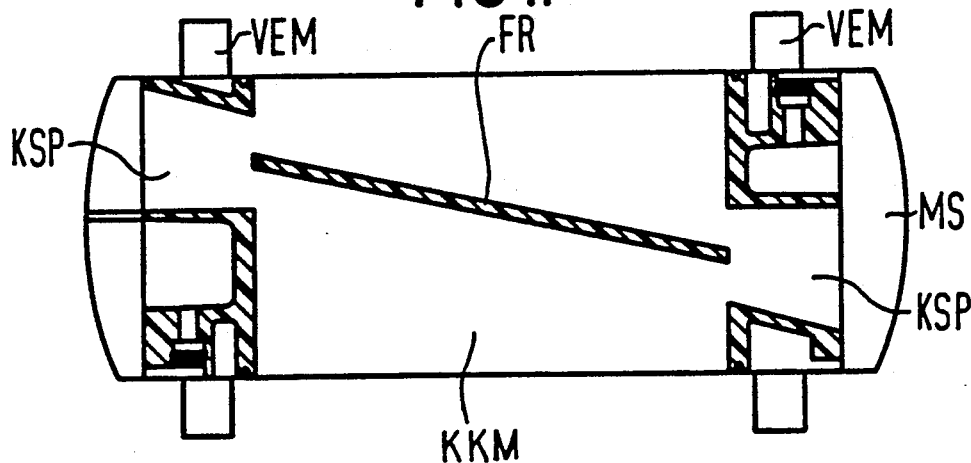
FIG. 11 is a cross sectional view taken along the lines XI—XI of FIG. 9.

As illustrated in FIG. 9, the middle segment MS, at one end, is provided with reinforcements for the ring groove RN. Approximately in the center, the segment MS has the reinforcing projecting connecting elements VEM. Moreover, the cross sectional view shows the successive reciting sealing cavities DH and the sealing lips DL, whereby the last cavity is used as a guiding chamber KKM for the wedges. The guiding rib FR is illustrated as proceeding transversely. As illustrated in FIG. 10, each of the sealing cavities has a vertically proceeding reinforcing rib VR, and the guiding rib is conducted across the width of the sealing member. The guiding rib VR, thus, also serves for reinforcing the sealing member. As illustrated in FIG. 11, the web chamber KKM of the middle segment MS has the guiding rib FR proceeding at an angle therethrough and the ends of the member have gaps KSP to which the wedges K can be inserted and will be moved into gripping relationship on the guiding rib FR.

Although various minor modifications may be suggested by those versed in the art, it should be understood that we wish to embody within the scope of the patent granted hereon all such modifications as reasonably and properly come within the scope of our contribution to the art.

We claim:

1. In an end member for sealing an end of a longitudinally divided cable fitting, said end member being composed of a plastic material and having adaptable cable entry openings which are formed in a parting plane of the member and which are cut, when desired, said end member having integrated clamping means for gripping the inserted cables, the improvements comprising said end member being divided in a transverse direction into two outer segments and a middle segment, with each segment having a planar surface cooperating with an adjacent segment to form a parting plane therebetween, reinforcing connecting elements being arranged to extend between the segments across the parting plane between two adjacent segments, each of the parting planes having gripping means composed of two cooperating pressure plates guided in chambers provided in the respective sealing member segments, said pressure plates having correspondingly applied entry openings for receiving a cable to be inserted therein, said clamping means including outer pressure means for urging pressure plates in the outer segment inward and inner pressure means for urging the pressure plates of the middle segment outward, said outer pressure means being arranged on the connecting elements.

2. In an end member according to claim 1, wherein the outer pressure means includes a clamp strap.

3. In an end member according to claim 2, wherein the inward pressure means comprises an expanding wedge being forced between two pressure plates carried in the middle segment.

4. In an end member according to claim 3, wherein the middle segment has guide means for each expanding wedge.

5. In an end member according to claim 4, wherein the guide means is in the shape of a transverse proceeding guiding rib and each expanding wedge has a corresponding guiding element for contacting said rib.

6. In an end member according to claim 5, wherein a guidance groove is arranged in an expanding wedge.

7. In an end member according to claim 5, wherein the expanding wedge is fashioned with a U-shape and in that the guiding rib is directed between the legs of said U-shaped expanding wedge.

8. In an end member according to claim 4, wherein the guide means is a guiding element arranged to extend obliquely relative to the respective parting planes.

9. In an end member according to claim 1, wherein the connecting elements for the segments are coaxial sleeves arranged on the individual sealing member segments and received within each other and include a screw inserted along the inner axis of said sleeve for holding the connecting elements together.

10. In an end member according to claim 9, wherein the sleeves of each of the outer segments form a unit with a clamp strap.

11. In an end member according to claim 1, wherein the pressure plates in the middle segment of the end member have a camfer corresponding to a wedge angle along their edges facing an expanding wedge.

12. In an end member according to claim 1, wherein the chambers for the pressure plates are arranged in a sealing member projecting part that extends along an axis extending parallel to the insertion planes with the chambers extending transversely relative to said axis and parallel to the sealing lamina of the sealing member.

13. In an end member according to claim 1, wherein means for spacing the pressure plates apart during the cutting out of an entry opening by a given distance corresponds to the thickness of a plastic sealing material to be inserted with the cable.

14. In an end member according to claim 1, wherein the inner pressure means for moving the pressure plates of the middle segment outwardly comprises at least one expanding wedge.

15. In an end member according to claim 14, which includes a guide being arranged in the middle segment for each expanding wedge, said guide and wedge having cooperating catch elements to hold the wedge on the guide.

16. In an end member according to claim 15, wherein the catch elements are teeth formed on the guide and corresponding teeth formed on each of the expansion wedges.

* * * * *